(12) United States Patent
Takahashi et al.

(10) Patent No.: US 12,523,713 B2
(45) Date of Patent: Jan. 13, 2026

(54) ARC DETECTION SYSTEM, ARC DETECTION METHOD, AND RECORDING MEDIUM

(71) Applicant: Panasonic Intellectual Property Management Co., Ltd., Osaka (JP)

(72) Inventors: Tatsuya Takahashi, Tokyo (JP); Tatsuo Koga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 210 days.

(21) Appl. No.: 18/247,708

(22) PCT Filed: Oct. 5, 2021

(86) PCT No.: PCT/JP2021/036856
§ 371 (c)(1),
(2) Date: Apr. 3, 2023

(87) PCT Pub. No.: WO2022/091716
PCT Pub. Date: May 5, 2022

(65) Prior Publication Data
US 2023/0341475 A1   Oct. 26, 2023

(30) Foreign Application Priority Data
Oct. 29, 2020   (JP) .................................. 2020-181251

(51) Int. Cl.
*G01R 31/58* (2020.01)
*G01R 31/12* (2020.01)
(Continued)

(52) U.S. Cl.
CPC ......... *G01R 31/58* (2020.01); *G01R 31/1272* (2013.01); *H02H 1/0015* (2013.01);
(Continued)

(58) Field of Classification Search
CPC .. G01R 31/1272; G01R 31/58; H02H 1/0015; H02H 1/04; H02H 3/50; H04B 3/46; H04B 3/54
(Continued)

(56) References Cited

U.S. PATENT DOCUMENTS

| 6,987,389 B1 * | 1/2006 | Macbeth ............. H02H 1/0015 324/536 |
| 2018/0233901 A1 | 8/2018 | Ashida et al. |

(Continued)

FOREIGN PATENT DOCUMENTS

| JP | 2007-327786 A | 12/2007 |
| JP | 2011-007765 A | 1/2011 |

(Continued)

OTHER PUBLICATIONS

International Search Report issued on Dec. 21, 2021 in International Patent Application No. PCT/JP2021/036856, with English translation.

*Primary Examiner* — Neel D Shah
*Assistant Examiner* — Adam S Clarke
(74) *Attorney, Agent, or Firm* — Rimon P.C.

(57) ABSTRACT

An arc detection system includes a first obtainment unit, a second obtainment unit, and a determination unit. The first obtainment unit obtains a measurement result of current flowing in a power line to which power is supplied from a power supply or a measurement result of voltage in the power line. The second obtainment unit obtains fluctuation information about a fluctuation in a load included in a device connected to the power line. The determination unit determines whether or not an arc fault has occurred in the power line based on components in a specific frequency band of the (Continued)

measurement result obtained by the first obtainment unit and the fluctuation information obtained by the second obtainment unit.

8 Claims, 3 Drawing Sheets

(51) Int. Cl.
  *H02H 1/00* (2006.01)
  *H02H 3/50* (2006.01)
  *H04B 3/46* (2015.01)
  *H04B 3/54* (2006.01)
(52) U.S. Cl.
  CPC ............... *H02H 3/50* (2013.01); *H04B 3/46* (2013.01); *H04B 3/54* (2013.01)
(58) Field of Classification Search
  USPC ........................................................ 324/536
  See application file for complete search history.

(56) References Cited

U.S. PATENT DOCUMENTS

| | | | |
|---|---|---|---|
| 2019/0181628 A1 | 6/2019 | Ward et al. | |
| 2019/0372522 A1* | 12/2019 | Okita | G01R 31/52 |
| 2020/0014188 A1* | 1/2020 | Koga | G05F 1/67 |

FOREIGN PATENT DOCUMENTS

| | | | |
|---|---|---|---|
| JP | 2017-143667 A | 8/2017 |
| JP | 2019-508715 A | 3/2019 |
| WO | 2017/129277 A1 | 8/2017 |

\* cited by examiner

ARC DETECTION SYSTEM, ARC DETECTION METHOD, AND RECORDING MEDIUM

CROSS-REFERENCE OF RELATED APPLICATIONS

This application is the U.S. National Phase under 35 U.S.C. § 371 of International Patent Application No. PCT/JP2021/036856, filed on Oct. 5, 2021, which in turn claims the benefit of Japanese Patent Application No. 2020-181251, filed on Oct. 29, 2020, the entire disclosures of which applications are incorporated by reference herein.

TECHNICAL FIELD

The present invention relates to an arc detection system, an arc detection method, and a recording medium for determining whether or not an arc fault may possibly occur in a power line.

BACKGROUND ART

PTL 1 discloses an arc detection means for detecting arcs. The arc detection means includes a voltage detection means for measuring the voltage between the input side wiring to the terminal block and the output side wiring from the terminal block, and a current detection means for measuring the current in the output side wiring from the terminal block. The arc detection means differentiates between electrical noise, etc., and arcs on the terminal block by simultaneously detecting fluctuations in the voltage value in the voltage detection means and fluctuations in the current value in the current detection means.

CITATION LIST

Patent Literature

[PTL 1] Japanese Unexamined Patent Application Publication No. 2011-7765

SUMMARY OF INVENTION

Technical Problem

The present invention provides an arc detection system, an arc detection method, and a recording medium that facilitate the prevention of false detection of the occurrence of arc faults.

Solution to Problem

An arc detection system according to one aspect of the present invention includes a first obtainment unit, a second obtainment unit, and a determination unit. The first obtainment unit is configured to obtain a measurement result of current flowing in a power line to which power is supplied from a power supply or a measurement result of voltage in the power line. The second obtainment unit is configured to obtain fluctuation information about a fluctuation in a load included in a device connected to the power line. The determination unit is configured to determine whether or not an arc fault has occurred in the power line based on components in a specific frequency band of the measurement result obtained by the first obtainment unit and the fluctuation information obtained by the second obtainment unit.

An arc detection method according to one aspect of the present invention includes: obtaining a measurement result of current flowing in a power line to which power is supplied from a power supply or a measurement result of voltage in the power line; obtaining fluctuation information about a fluctuation in a load included in a device connected to the power line; and determining whether or not an arc fault has occurred in the power line based on components in a specific frequency band of the measurement result obtained and the fluctuation information obtained.

A non-transitory computer-readable recording medium according to one aspect of the present invention has recorded thereon a program for causing one or more processors to execute the arc detection method described above.

Advantageous Effects of Invention

One aspect of the present invention has the advantage that it is easy to prevent false detection of the occurrence of arc faults.

DESCRIPTION OF EMBODIMENTS

The following describes embodiments of the present invention with reference to the drawings. The embodiments described below each show a specific example of the present invention. The numerical values, shapes, materials, elements, the arrangement and connection of the elements, steps, the order of the steps, etc., indicated in the following embodiments are mere examples, and therefore do not intend to limit the present invention.

Note that the respective figures are schematic diagrams and are not necessarily precise illustrations. Additionally, like reference signs indicate like elements. As such, overlapping explanations of like elements are omitted or simplified.

[Configuration]

Figure 1:
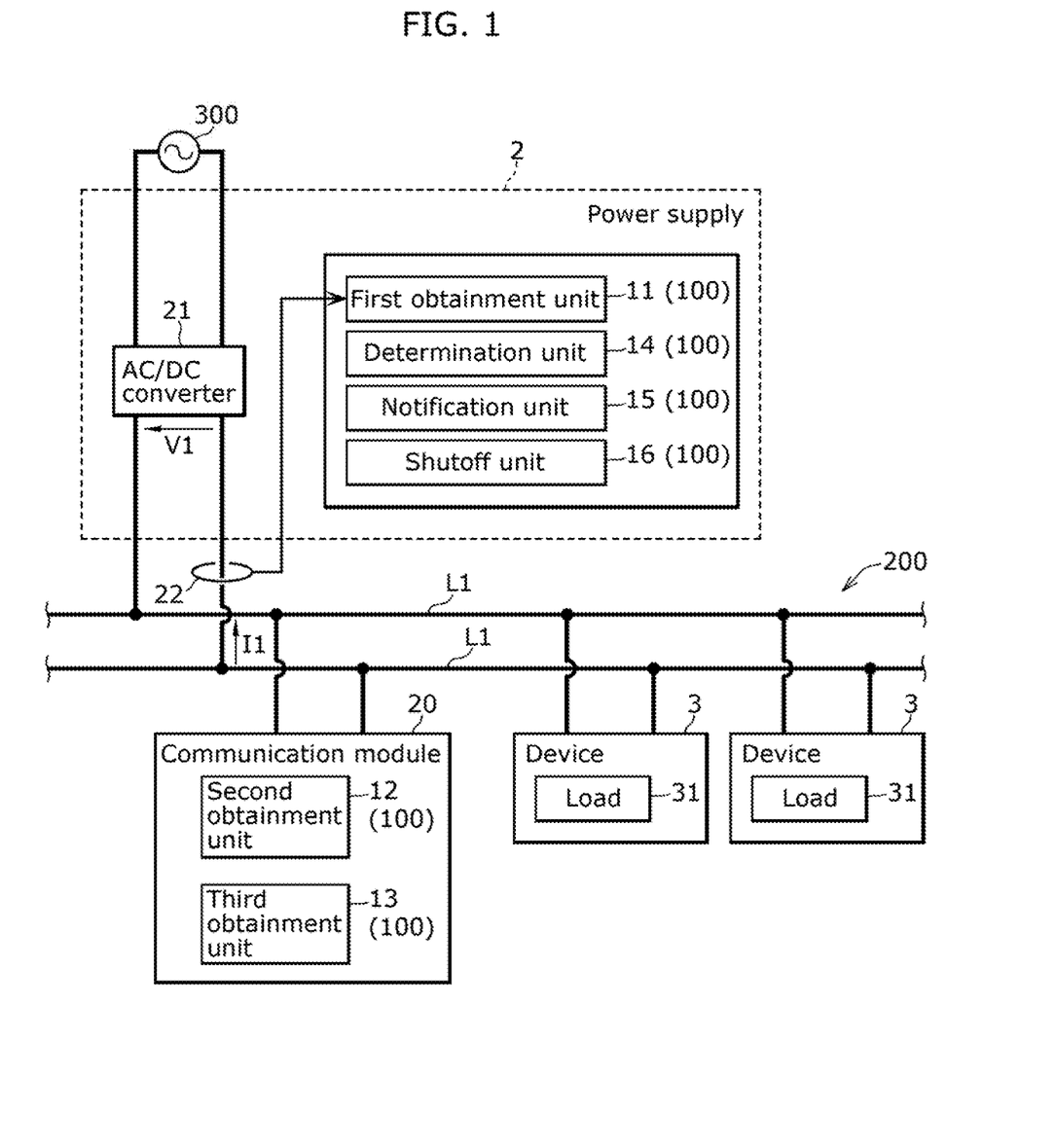
FIG. 1 is a diagram of the overall structure including an arc detection system according to an embodiment of the present disclosure.

The arc detection system according to the embodiment will be described with reference to FIG. 1. FIG. 1 is a diagram of the overall structure including arc detection system 100 according to the embodiment.

Arc detection system 100 is primarily a system for determining whether or not an arc fault has occurred in power line L1 to which power is supplied from the power supply 2. Stated differently, power line L1 may be damaged or broken by, for example, external factors or age-related deterioration, and arcing (arc discharge) may occur due to such damage, ultimately resulting in an arc fault. Arc detection system 100 is therefore primarily used to detect arc faults that may occur in power line L1.

More specifically, arc detection system 100 is used in what is known as direct current (DC) distribution network 200. DC distribution network 200 includes one or more power lines L1. FIG. 1 illustrates an example in which DC distribution network 200 includes only one power line L1. DC power is supplied to DC distribution network 200 from power supply (in this case, a DC power supply) 2. Each power line L1 includes a pair of power lines: a positive power line connected to the positive electrode on the output side of power supply 2 and a negative power line connected to the negative electrode on the output side of power supply 2.

Here, if DC distribution network 200 includes only one power line L1, DC power is supplied from power supply 2 to this power line L1. If DC distribution network 200 includes a plurality of power lines L1, one end of each power line L1 is connected to one or more branch points. Therefore, when DC power is supplied from power supply 2 to one of power lines L1, DC power is also supplied to the other power lines L1 through the one or more branch points.

In the embodiment, power supply 2 is a power converter including AC/DC converter 21. Power supply 2 converts AC power output from power grid 300 into DC power and outputs the converted DC power to power line L1 to which power supply 2 is connected. If DC distribution network 200 includes a plurality of power lines L1, the DC power output to the above-described power line L1 is also output to the other power lines L1. In the embodiment, power supply 2 may be configured to output DC power, and may be a distributed power supply such as solar cells, a power supply such as storage batteries, or a combination of these power supplies and a power converter (for example, a power converter that includes a DC/DC converter circuit).

Each power line L1 is configured as a duct rail, for example, to which one or more devices 3 can be attached. Stated differently, one or more devices 3 can be arranged in any position on each power line L1. Each power line L1 may of course be configured such that locations where one or more devices 3 can be attached are defined in advance. In the embodiment, each power line L1 is located on the ceiling of a facility, but each power line L1 may be located on the floor, a wall, or a fixture in the facility.

Device 3 includes load 31 and a pair of connecting terminals. Device 3 also includes a function for communicating with second obtainment unit 12 (described below) of arc detection system 100. The communication function is realized when device 3 is operating. In other words, in the embodiment, device 3 can communicate with second obtainment unit 12 when device 3 is connected to power line L1, but cannot communicate with second obtainment unit 12 when it is not connected to power line L1.

Device 3 can be attached to or detached from power line L1 via the pair of connecting terminals. More specifically, when attaching device 3 to power line L1, device 3 is rotated clockwise or counterclockwise by a predetermined angle (for example, 90 degrees) in a view from the direction of insertion of device 3, with the pair of connecting terminals of device 3 inserted into the duct rail (power line L1). This fixes the pair of connecting terminals in place while they are in contact with a pair of connecting conductors provided in power line L1, thereby electrically and mechanically connecting device 3 to power line L1.

Device 3 is detached from power line L1 by rotating device 3 by a predetermined angle in a view from the direction of insertion of device 3, in the opposite direction from that described above. This releases the contact between the pair of connecting terminals and the pair of connecting conductors, enabling device 3 to be detached from power line L1. Load 31 is driven by the DC power supplied from power supply 2 via power line L1 when device 3 is attached to power line L1.

In the embodiment, device 3 is a lighting fixture, but device 3 may be, for example, a loudspeaker, a camera, a sensor, or a USB power delivery (PD). Stated differently, device 3 may be a device other than a lighting fixture as long as load 31 is driven by electric power. In the embodiment, all of devices 3 connected to power lines L1 are lighting fixtures, i.e., are of one type of device, but a plurality of types of devices 3 may be connected to power lines L1. For example, a lighting fixture, a loudspeaker, a camera, a sensor, and a USB PD may be connected to power lines L1. These devices 3 may be all connected to a single power line L1, or they may be connected separately to a plurality of power lines L1.

Arc detection system 100 includes first obtainment unit 11, second obtainment unit 12, third obtainment unit 13, determination unit 14, notification unit 15, and shutoff unit 16 as functional components for determining whether an arc fault has occurred. In the embodiment, first obtainment unit 11, determination unit 14, notification unit 15, and shutoff unit 16 are provided in power supply 2. Second obtainment unit 12 and third obtainment unit 13 are provided in communication module 20, which is connected to power line L1, rather than in power supply 2. Communication module 20 is configured to communicate with power supply 2 by, for example, wireless communication or power line communication (PLC).

In each of power supply 2 and communication module 20, arc detection system 100 is, for example, a microcontroller or a device that includes a microcontroller. A microcontroller is a semiconductor integrated circuit, etc., that includes ROM in which a program is stored, RAM, a processor (a central processing unit (CPU)) that executes the program, a timer, an A/D converter, and a D/A converter. First obtainment unit 11, second obtainment unit 12, third obtainment unit 13, determination unit 14, notification unit 15, and shutoff unit 16 are all realized by the processor executing the above program.

First obtainment unit 11 obtains a measurement result of current I1 flowing in power line L1 or voltage V1 in power line L1 to which power is supplied from power supply 2. In the embodiment, first obtainment unit 11 obtains the measurement result of current I1 by sampling at predetermined intervals (i.e., on a sampling cycle) by current meter 22. Stated differently, first obtainment unit 11 obtains the measurement result of current I1 from current meter 22 at predetermined intervals. Current meter 22 is provided between power supply 2 and power line L1, and measures the current flowing in the negative power line of power line L1 (i.e., current I1 in power line L1). Current meter 22 may be built into power supply 2.

Second obtainment unit 12 obtains fluctuation information about fluctuations in loads 31 included in devices 3 connected to power line L1. Here, fluctuations in load 31 refer to fluctuations in the power consumed by load 31, and in particular, to fluctuations in the current flowing through load 31. The fluctuation information can include information that directly or indirectly represents changes in the power consumed by load 31 (or the current flowing through load 31). Fluctuations in load 31 can occur, for example, when device 3 is turned on or off, or when the operating mode of device 3 is changed.

In the embodiment, second obtainment unit 12 communicates with device 3 to obtain from device 3, as the fluctuation information, an amount of change in the power consumed by load 31. Stated differently, device 3 regularly measures the power consumed by load 31 (or the current flowing through load 31) using, for example, a built-in current meter. Second obtainment unit 12 obtains a result of the measurement taken in device 3 by communicating with device 3, calculates an amount of change in the power consumed by load 31 from time series data of the obtained measurement results, and takes this calculation as the fluctuation information. Note that the amount of change in the power consumed by load 31 may be calculated by device 3. In such cases, second obtainment unit 12 communicates with device 3 to obtain, as the fluctuation information, an amount of change in the power consumed by load 31. The communication standard used for communication between second obtainment unit 12 and device 3 is not particularly limited. The communication between second obtainment unit 12 and device 3 may be wired, wireless, or power line communication.

Third obtainment unit 13 obtains status information about the operational statuses of devices 3. The operational status of device 3 can be broadly classified to include a normal state and a standby state. A normal state refers to a state in which load 31 included in device 3 is receiving power, operating, and carrying out its usual functions. A standby state refers to a state in which load 31 included in device 3 is receiving power, but is not carrying out its usual functions and is rather waiting for a command to switch to the normal state. In the standby state, the power consumed by load 31 (or the current flowing through load 31) is less than in the normal state.

In the embodiment, third obtainment unit 13 obtains status information from devices 3 by receiving signals containing the status information from devices 3 through communicating with devices 3. Third obtainment unit 13 may obtain status information based on the amount of communication with device 3, with the normal state being more than a predetermined amount of communication and the standby state being less than a predetermined amount of communication. The communication standard used for communication between third obtainment unit 13 and device 3 is not particularly limited. The communication between third obtainment unit 13 and device 3 may be wired, wireless, or power line communication. In the embodiment, second obtainment unit 12 and third obtainment unit 13 may be realized by a single obtainment unit.

In the embodiment, second obtainment unit 12 and third obtainment unit 13 communicate at regular intervals (for example, every several hundred milliseconds) with devices 3 that are connected to power line L1 and operating. For example, second obtainment unit 12 and third obtainment unit 13 may communicate with devices 3 by receiving signals unilaterally transmitted from devices 3 that are connected to power line L1 and operating. For example, second obtainment unit 12 and third obtainment unit 13 may communicate with devices 3 by broadcasting a request signal containing a command requesting a reply and receiving a response signal from device 3 that received the request signal.

The signal transmitted from device 3 toward second obtainment unit 12 and third obtainment unit 13 includes information identifying the source device 3. Arc detection system 100 is therefore able to know the fluctuation information and the status information for each device 3.

Determination unit 14 determines whether or not an arc fault has occurred in power line L1 based on components in a specific frequency band of the measurement result obtained by first obtainment unit 11 and the fluctuation information obtained by second obtainment unit 12. More specifically, determination unit 14 performs a frequency analysis of the measurement result of current I1 obtained by first obtainment unit 11. Frequency analysis involves, for example, calculating the frequency spectrum of the measurement result of current I1 by calculating the Fourier transform (in this case, Fast Fourier Transform (FFT)) of the time waveform of the measurement result of current IL. Determination unit 14 then refers to the calculated frequency spectrum and determines that an arc has occurred if the measurement result of current I1 contains a first predetermined value of specific frequency band components or more. The specific frequency band is, for example, a band that includes the frequency of noise generated when an arc occurs. In one example, the specific frequency band is the band of tens of kHz, which is a relatively high frequency band. Note that the frequency of the noise generated in the above case can be obtained experimentally.

Determination unit 14 then determines whether or not an arc fault has occurred in power line L1 by referencing not only the determination of whether or not an arc has occurred based on the measurement result obtained by first obtainment unit 11, but also the fluctuation information obtained by second obtainment unit 12. In other words, determination unit 14 does not determine that an arc fault has occurred in power line L1 simply by determining that an arc has occurred based on the measurement result obtained by first obtainment unit 11. The following is an explanation of how the inventors came to determine the occurrence of arc faults in this manner.

In DC distribution network 200, arcing can occur due to a disconnection or partial disconnection in power line L1. When this arcing occurs, components in a specific frequency band are superimposed on current I1. (or voltage V1). Determination unit 14 can therefore determine that an arc has occurred by monitoring specific frequency band components of current I1. (or voltage V1). However, even in cases of an abrupt fluctuation in load 31 included in device 3, it is possible for specific frequency band components to be superimposed on current I1. (or voltage V1). Such a phenomenon can occur not only in DC distribution network 200, but also in an alternating current (AC) distribution network.

Arcs caused by a disconnection or partial disconnection in power line L1 tend to cause arc faults, but the above phenomenon is not caused by the occurrence of arcs in power line L1 in the first place, and is thus not a cause of arc faults. It is therefore desirable for arc detection system 100 to ignore this phenomenon and primarily determine the occurrence of an arc caused by a disconnection or partial disconnection in power line L1 as the occurrence of an arc fault.

In view of this, in the embodiment, in order to satisfy the above requirement, determination unit 14 determines whether or not an arc fault has occurred in power line L1 as follows. Determination unit 14 first determines whether or not an arc has occurred based on a measurement result obtained by first obtainment unit 11. If determination unit 14 determines that an arc has occurred, it monitors the duration of the determination that an arc has occurred. If the duration is less than a first threshold, determination unit 14 determines that an arc fault has not occurred in power line L1, regardless of the fluctuation information obtained by second obtainment unit 12. If the duration is greater than or equal to the first threshold and less than a second threshold, determination unit 14 determines whether or not an arc fault has occurred in power line L1 as described in the first determination example or the second determination example below. If the duration is greater than or equal to the second threshold, determination unit 14 determines whether or not an arc fault has occurred in power line L1 as described in the third determination example below. The first threshold and the second threshold are set in advance, for example, by the user of arc detection system 100.

Figure 2A:
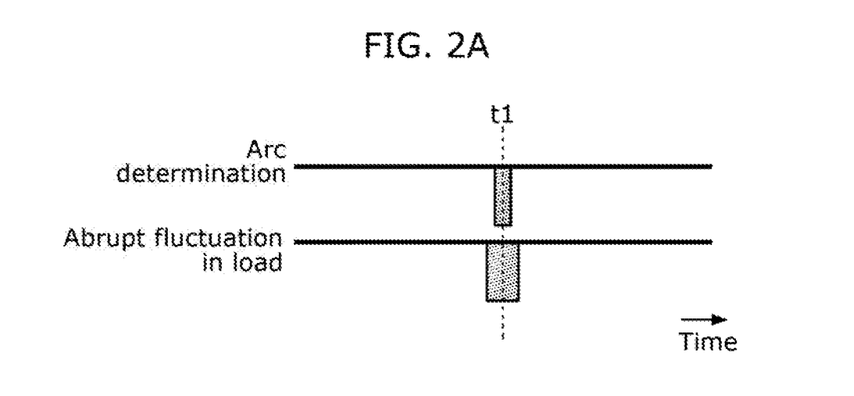
FIG. 2A is a timing chart illustrating a first determination example by a determination unit of the arc detection system according to an embodiment of the present disclosure.
Figure 2B:
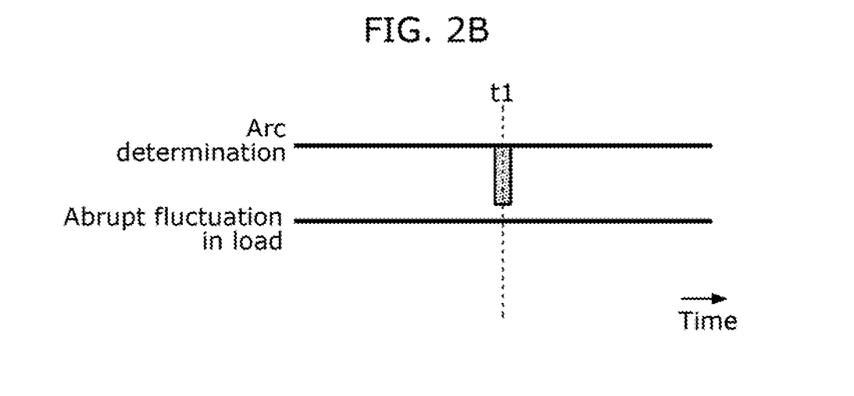
FIG. 2B is a timing chart illustrating a second determination example by the determination unit of the arc detection system according to an embodiment of the present disclosure.
Figure 2C:
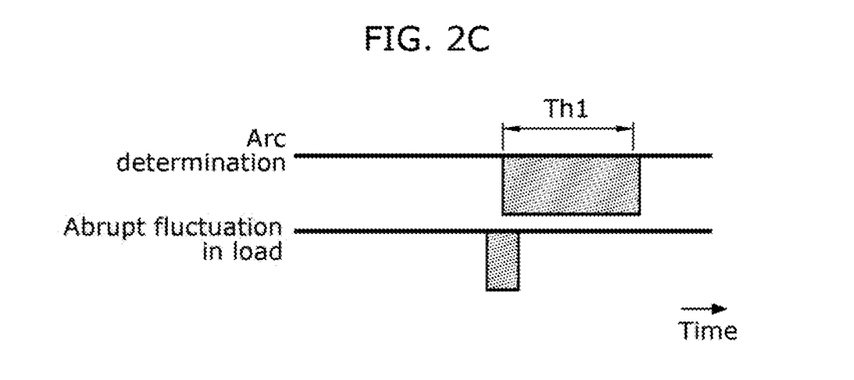
FIG. 2C is a timing chart illustrating a third determination example by the determination unit of the arc detection system according to an embodiment of the present disclosure.

FIG. 2A is a timing chart illustrating the first determination example by determination unit 14 of arc detection system 100 according to the embodiment. FIG. 2B is a timing chart illustrating the second determination example by determination unit 14 of arc detection system 100 according to the embodiment. FIG. 2C is a timing chart illustrating the third determination example by determination unit 14 of arc detection system 100 according to the embodiment. In each of FIG. 2A through FIG. 2C, the pulses in the upper timing chart represent the duration of a determination that an arc has occurred by determination unit 14. In each of FIG. 2A through FIG. 2C, the pulses in the lower timing chart indicate the presence of an abrupt fluctuation in load 31. Note that in FIG. 2B, no pulses are shown because no abrupt fluctuation occurs in load 31, as will be described below.

As illustrated in FIG. 2A, in the first determination example, second obtainment unit 12 obtains fluctuation information indicating an abrupt fluctuation occurred in load 31 at time t1, which is when determination unit 14 determines that an arc has occurred based on a measurement result obtained by first obtainment unit 11 (hereinafter also referred to as "at determination time" t1). Therefore, in the first determination example, determination unit 14 determines that an arc has not occurred in power line L1 due to the occurrence of the abrupt fluctuation in load 31 at determination time t1, and thus determines that an arc fault has not occurred in power line L1.

As illustrated in FIG. 2B, in the second determination example, at determination time t1, second obtainment unit 12 obtains fluctuation information indicating that no fluctuation has occurred in load 31. Therefore, in the second determination example, determination unit 14 determines that an arc caused by a disconnection or partial disconnection in power line L1 has occurred, i.e., an arc fault has occurred, because no abrupt fluctuation has occurred in load 31 at determination time t1.

Thus, in the first determination example and the second determination example, when determination unit 14 determines that an arc has occurred based on the measurement result obtained by first obtainment unit 11 and, at the time of the determination, an abrupt fluctuation occurred in load 31, determination unit 14 determines that an arc fault has not occurred. Here, whether or not an abrupt fluctuation occurred in load 31 is determined by the amount of change (gradient) per unit time in the power consumed by load 31, i.e., whether or not the amount of change in the power consumed by load 31 is greater than or equal to a threshold. More specifically, determination unit 14 determines that an abrupt fluctuation occurred in load 31 if the amount of change is greater than or equal to the threshold, and determines that no abrupt fluctuation occurred in load 31 if the amount of change is less than the threshold. The threshold is set in advance, for example, by the user of arc detection system 100.

The term "at the time of the determination" does not include only the moment of determination time t1, but may include a range from a predetermined amount of time before determination time t1 to a predetermined amount of time after determination time t1.

As illustrated in FIG. 2C, in the third determination example, although second obtainment unit 12 obtains fluctuation information indicating that an abrupt fluctuation occurred in load 31, the duration of the determination by determination unit 14 that an arc has occurred is longer than the second threshold value (threshold time Th1). Accordingly, in the third determination example, determination unit 14 determines that an arc caused by a disconnection or partial disconnection in power line L1 has occurred, i.e., that an arc fault has occurred, without referencing the fluctuation information obtained by second obtainment unit 12. In this way, when determination unit 14 has determined, for the second threshold (threshold time Th1) amount of time or longer, that an arc fault has occurred based on a measurement result obtained by first obtainment unit 11, it determines that an arc fault has occurred regardless of the fluctuation information obtained by second obtainment unit 12.

Furthermore, in the embodiment, determination unit 14 determines whether or not an arc fault has occurred in power line L1 by referencing the status information obtained by third obtainment unit 13. More specifically, when determination unit 14 determines that an arc has occurred based on the measurement result obtained by first obtainment unit 11 and the operational status of device 3 obtained by third obtainment unit 13 indicates device 3 is in the standby state, determination unit 14 determines that an arc fault has occurred regardless of the fluctuation information obtained by second obtainment unit 12. In other words, if the operational status of device 3 indicates device 3 is in the standby state, the power consumed by load 31 is relatively small and thus an abrupt fluctuation cannot even occur in load 31 in the first place. Therefore, if the operational status of device 3 indicates device 3 is in the standby state, determination unit 14 determines that an arc fault has occurred based on the measurement result obtained by first obtainment unit 11, without referencing the fluctuation information.

Notification unit 15 notifies the surrounding area that an arc fault has occurred by, for example, lighting a lamp or sounding a buzzer. Notification unit 15 may also notify that an arc fault has occurred by transmitting information indicating such to an information terminal of the owner or manager of arc detection system 100. Information terminals can include, for example, portable terminals such as smartphones or tablets, as well as personal computers.

Shutoff unit 16 stops the current flowing in power line L1 when determination unit 14 determines that an arc fault has occurred. This extinguishes any arc discharge that may have occurred due to the arc fault.

For example, shutoff unit 16 stops the current flowing in power line L1 by controlling a switch connected to power line L1. The switch is, for example, a mechanical or semiconductor switch. Examples of mechanical switches include relays and breakers, and examples of semiconductor switches include transistors and diodes.

The switch connected to power line L1 may be a switch directly connected to power line L1 or indirectly connected to power line L1. For example, the switch is a switch that realizes the AC/DC conversion function in AC/DC converter 21. Even though the switch is not directly connected to power line L1, it is indirectly connected to power line L1, and thus is considered a switch connected to power line L1. For example, shutoff unit 16 stops the current flowing in power line L1 by controlling the switch to stop the switching operation of the switch.

The switch may be configured to turn power supply 2 on and off. In such cases, shutoff unit 16 stops the current flowing in power line L1 by controlling the switch to turn power supply 2 off.

The switch may be provided on power line L1, and the switch may be configured to open or close power line L1. For example, shutoff unit 16 may stop the current flowing in power line L1 by controlling the switch to open power line L1.

[Operations]

Figure 3:
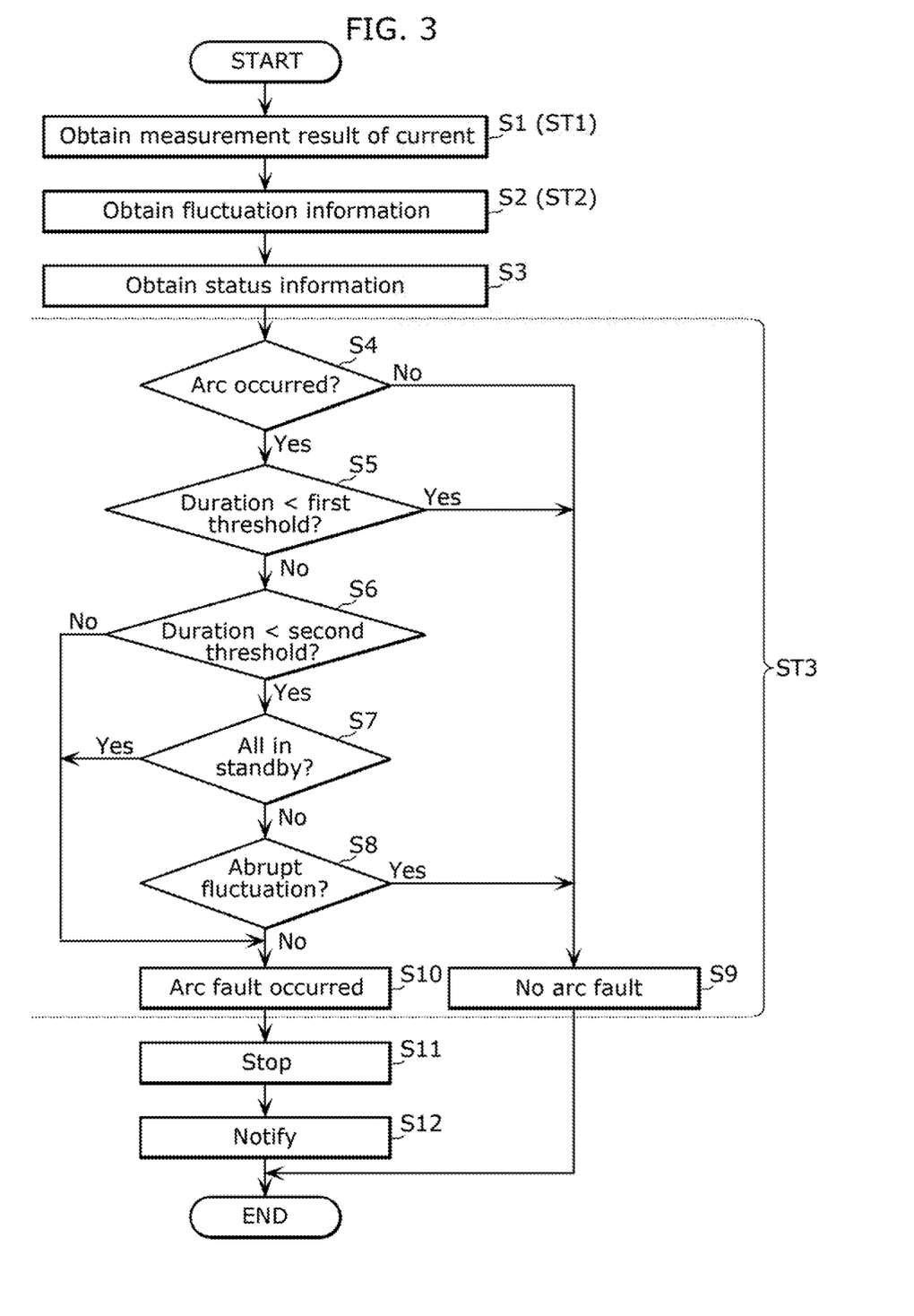
FIG. 3 is a flowchart illustrating an operation example of the arc detection system according to an embodiment of the present disclosure.

Hereinafter, one example of arc detection system 100 according to the embodiment will be described with reference to FIG. 3. FIG. 3 is a flowchart illustrating an operation example of arc detection system 100 according to the embodiment.

First, first obtainment unit 11 obtains the measurement result of current I1 from current meter 22 at predetermined intervals (S1). Process S1 corresponds to first obtainment step ST1 of the arc detection method. Next, second obtainment unit 12 obtains fluctuation information from each device 3 by communicating with each device 3 (S2). Process S2 corresponds to second obtainment step ST2 of the arc detection method. Third obtainment unit 13 then obtains status information from each device 3 by communicating with each device 3 (S3).

Then, determination unit 14 first determines whether or not an arc has occurred based on components in a specific frequency band of the measurement result of current I1 obtained by first obtainment unit 11 (S4). Here, determination unit 14 performs a frequency analysis of the measurement result of current I1 obtained by first obtainment unit 11 to make the determination. If determination unit 14 determines that an arc has occurred (Yes in S4), it monitors the duration of the determination that an arc has occurred (S5). However, if determination unit 14 determines that no arc has occurred (No in S4), it determines that no arc fault has occurred (S9).

When determination unit 14 determines that an arc has occurred, if the duration is less than the first threshold (Yes in S5), determination unit 14 determines that no arc fault has occurred (S9). If the duration is greater than or equal to the second threshold (No in S5, No in S6), determination unit 14 determines that an arc fault has occurred (S10). However, if the duration is greater than or equal to the first threshold (No in S5) and less than the second threshold (Yes in S6), determination unit 14 references the status information obtained by third obtainment unit 13 to monitor the operational status of each device 3 (S7).

If all devices 3 are in the standby state (Yes in S7), determination unit 14 determines that an arc fault has occurred (S10). However, if at least one device 3 is in the normal state (No in S7), determination unit 14 references the fluctuation information obtained by second obtainment unit 12 to monitor whether or not an abrupt fluctuation has occurred in load 31 at determination time t1 (S8).

If an abrupt fluctuation has occurred in load 31 in any device 3 whose operational status is the normal state (Yes in S8), determination unit 14 determines that an arc fault has not occurred (S9). However, if no abrupt fluctuation has occurred in load 31 in any device 3 whose operational status is the normal state (No in S8), determination unit 14 determines that an arc fault has occurred (S10). Processes S4 through S10 correspond to determination step ST3 of the arc detection method.

If determination unit 14 determines that an arc fault has occurred (S10), shutoff unit 16 stops the power supply from power supply 2 to power line L1 by stopping the current flowing in power line L1 (S11). Notification unit 15 then notifies of the occurrence of the arc fault (S12). However, if determination unit 14 determines that no arc fault has occurred (S9), arc detection system 100 ends the process. The above series of processes S1 through S12 are thereafter repeated.

[Advantages]

Hereinafter, the advantages of arc detection system 100 according to the embodiment will be explained by way of comparison with a comparative arc detection system. The comparative arc detection system differs from arc detection system 100 according to the embodiment in that it does not include second obtainment unit 12 or third obtainment unit 13. Stated differently, the comparative arc detection system differs from arc detection system 100 according to the embodiment in that it immediately determines that an arc fault has occurred when the measurement result of current I1 obtained by first obtainment unit 11 contains a first predetermined value of specific frequency band components or more.

First, conditions required for an arc detection system will be described. If an arc occurs due to a disconnection or partial disconnection in power line L1 and is left unattended, the disconnected or partially disconnected part may generate excessive heat and possibly ignite, leading to a fire. It is therefore important for the arc detection system to detect the occurrence of arcs (i.e., arc faults) as soon as possible and to stop the supply of power to power line L1 before the situation escalates to a point where a fire can occur. For example, the Underwriters Laboratories (UL) standard requires that arc faults be detected within 2 seconds of occurrence of an arc.

Although the comparative arc detection system is capable of detecting the occurrence of arc faults, it determines that an arc fault has occurred not only when an arc is caused by a disconnection or partial disconnection in power line L1, but also when an abrupt fluctuation has occurred in load 31 included in device 3. Stated differently, the comparative arc detection system incorrectly determines that an arc fault has occurred even when no arc has actually occurred. In this way, the comparative arc detection system determines that an arc fault has occurred each time an abrupt fluctuation occurs in load 31, which may be less user-friendly. For example, this could lead to the user being notified that an arc fault has occurred each time device 3 is turned on or off, which would be bothersome to the user. Assume, for example, that the comparative arc detection system is configured to automatically stop supplying power from power supply 2 to power line L1 when it determines that an arc fault has occurred. With this configuration, the supply of power to power line L1 is stopped each time device 3 is turned on or off, which is also bothersome to the user.

However, since arc detection system 100 according to the embodiment includes second obtainment unit 12, determination unit 14 can determine whether or not an abrupt fluctuation has occurred in load 31. Arc detection system 100 according to the embodiment therefore determines that an arc fault has occurred when an arc is caused by a disconnection or partial disconnection in power line L1, and generally does not determine that an arc fault has occurred when an abrupt fluctuation has occurred in load 31.

Stated differently, arc detection system 100 according to the embodiment is unlikely to determine that an arc fault has occurred when an abrupt fluctuation occurs in load 31. In other words, arc detection system 100 according to the embodiment has the advantage that false detection of abrupt fluctuations in load 31 as the occurrence of an arc fault can be easily prevented, thus making it easier to prevent false detection of occurrences of arc faults. Therefore, with arc detection system 100 according to the embodiment, the above-described events that could possibly occur in the comparative arc detection system are not likely to occur. Stated differently, arc detection system 100 according to the embodiment has the advantage of being user-friendly because it can notify the user or stop the supply of power to power line L1 only when an arc fault occurs, which is considered to be an event that has a particularly large impact on the user.

[Variations]

Although an embodiment has been described above, the present invention is not limited to this embodiment. Hereinafter, examples of variations of the embodiment will be given. The variations described below may be combined where appropriate.

In the embodiment, current meter 22 is provided as a separate device from arc detection system 100, but current meter 22 may be provided in arc detection system 100.

In the embodiment, second obtainment unit 12 communicates at regular intervals with devices 3 that are connected to power line L1 and operating, but this example is non-limiting. For example, second obtainment unit 12 may communicate with devices 3 on an irregular basis.

In the embodiment, second obtainment unit 12 obtains fluctuation information by communicating with device 3, but this example is non-limiting. For example, second obtainment unit 12 may obtain, as the fluctuation information, a control command transmitted toward device 3. This can be implemented when second obtainment unit 12 is capable of obtaining control commands that are transmitted toward device 3 by a controller for remotely controlling device 3. Stated differently, with device 3 configured to receive control commands, since device 3 operates according to the content of the control command and load 31 fluctuates, second obtainment unit 12 can indirectly ascertain fluctuations in load 31 from the content of the obtained control command.

With this, when determination unit 14 determines that an arc has occurred based on the measurement result obtained by first obtainment unit 11 and, at the time of the determination, the control command leads to a threshold amount of change or more in power consumed by load 31, determination unit 14 determines that an arc fault has not occurred. For example, if the control command obtained by second obtainment unit 12 is for turning device 3 on or off or for changing the operating mode of device 3, determination unit 14 estimates that an abrupt fluctuation has occurred in load 31. With this, it is possible to determine whether an arc fault has occurred without waiting for a signal from device 3.

Second obtainment unit 12 may obtain the fluctuation information without communicating with device 3. If an abrupt fluctuation occurs in load 31 included in device 3, current I1 flowing in power line L1 will also change along with this abrupt fluctuation. Thus, based on the measurement results of current I1 measured by current meter 22, for example, second obtainment unit 12 can obtain the fluctuation information.

In the embodiment, arc detection system 100 is provided in power supply 2, but this example is non-limiting. For example, arc detection system 100 may be connected to power line L1 as a separate device from power supply 2. In such cases, if arc detection system 100 is configured to communicate with power supply 2 via wired, wireless, or power line communication, it is possible to give instructions to power supply 2 according to the determination results of determination unit 14.

In the embodiment, determination unit 14 extracts components in a specific frequency band by performing frequency analysis on the measurement result of current I1 obtained by first obtainment unit 11, but this example is non-limiting. For example, instead of performing frequency analysis, determination unit 14 may extract frequency components in a specific frequency band by passing the measurement result of current I1 obtained by first obtainment unit 11 through a filter (for example, a bandpass filter).

In the embodiment, first obtainment unit 11 obtains the measurement result of current I1, but it may also obtain a measurement result of voltage V1. In such cases, first obtainment unit 11 obtains the measurement result of voltage V1 by sampling at predetermined intervals (i.e., on a sampling cycle) by a voltmeter instead of current meter 22. Stated differently, first obtainment unit 11 obtains the measurement result of voltage V1 from a voltmeter at predetermined intervals. The voltmeter is provided in power supply 2 and measures the voltage between the positive and negative power lines of power line L1 (i.e., measures voltage V1 in power line L1). The voltmeter does not need to be provided in power supply 2 and may be a separate device from power supply 2.

In such cases, determination unit 14 determines whether or not an arc is occurring based on components in a specific frequency band of the measurement result of voltage V1 obtained by first obtainment unit 11. More specifically, determination unit 14 performs a frequency analysis of the measurement result of voltage V1 obtained by first obtainment unit 11. Determination unit 14 then refers to the calculated frequency spectrum and determines that an arc has occurred if the measurement result of voltage V1 contains a first predetermined value of specific frequency band components or more. The specific frequency band is, for example, a band that includes the frequency of noise generated when an arc fault occurs. In one example, the specific frequency band is the band of tens of kHz, which is a relatively high frequency band. Note that the frequency of the noise generated in the above case can be obtained experimentally.

In the embodiment, second obtainment unit 12 is provided in communication module 20, which is connected to power line L1 separately from power supply 2, but this example is non-limiting. For example, second obtainment unit 12 may be provided in power supply 2. In such cases, communication module 20 is not needed in arc detection system 100.

In the embodiment, arc detection system 100 includes third obtainment unit 13, but arc detection system 100 does not need to include third obtainment unit 13. In such cases, determination unit 14 may determine whether or not an arc fault has occurred based only on the measurement result obtained by first obtainment unit 11 and the fluctuation information obtained by second obtainment unit 12.

In the embodiment, determination unit 14 determines that an arc fault has occurred if the duration of the determination that an arc has occurred is greater than or equal to the second threshold (threshold time Th1), regardless of the fluctuation information obtained by second obtainment unit 12, but this example is non-limiting. For example, determination unit 14 may determine that an arc fault has occurred if the measurement result contains a second predetermined value of specific frequency band components or more (second predetermined value>first predetermined value), regardless of the fluctuation information obtained by second obtainment unit 12.

In the embodiment, shutoff unit 16 stops the current flowing in power line L1 when determination unit 14 determines that an arc fault has occurred, but this example is non-limiting. For example, shutoff unit 16 may be configured to individually turn off devices 3 when determination unit 14 determines that an arc fault has occurred. This can be achieved, for example, by providing device 3 with a DC/DC converter circuit and having shutoff unit 16 send a command to device 3 for turning off the switching elements of the DC/DC converter circuit. With this, it is possible to take measures such as turning off only those devices 3 related to the arc fault and keeping other devices 3 in operation.

In the embodiment, arc detection system 100 is used in DC distribution network 200, but this example is non-limiting. For example, arc detection system 100 may be used in an AC distribution network. In such cases, power supply 2 is an AC power supply.

For example, the present invention can be realized not only as arc detection system 100, but also as an arc detection method that includes steps (processes) performed by elements of arc detection system 100.

More specifically, the arc detection method includes first obtainment step ST1, second obtainment step ST2, and determination step ST3. In first obtainment step ST1, a measurement result of current I1 flowing in power line L1 or voltage V1 in power line L1 to which power is supplied from power supply 2 is obtained. In second obtainment step ST2, fluctuation information about a fluctuation in load 31 included in device 3 connected to power line L1 is obtained. In determination step ST3, whether or not an arc fault has occurred in power line L1 is determined based on components in a specific frequency band of the measurement result obtained in first obtainment step ST1 and the fluctuation information obtained in second obtainment step ST2.

For example, these steps may be performed by a computer (a computer system) including one or more processors. The present invention can be realized as a program for causing the computer to execute the steps included in the method. The present invention can further be realized as a non-transitory computer-readable recording medium, such as a CD-ROM, recorded with the program. More specifically, the program causes one or more processors to execute the arc detection method described above.

Although at least part of arc detection system 100 in each of the above embodiments is realized as software in a microcontroller, it may also be realized as software in a general-purpose computer such as a personal computer. Furthermore, at least part of arc detection system 100 may be realized as hardware via dedicated electronic circuitry of A/D converters, logic circuits, gate arrays, D/A converters, etc.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

CONCLUSION

As described above, arc detection system 100 includes first obtainment unit 11, second obtainment unit 12, and determination unit 14. First obtainment unit 11 obtains a measurement result of current I1 flowing in power line L1 or voltage V1 in power line L1 to which power is supplied from power supply 2. Second obtainment unit 12 obtains fluctuation information about fluctuations in loads 31 included in devices 3 connected to power line L1. Determination unit 14 determines whether or not an arc fault has occurred in power line L1 based on components in a specific frequency band of the measurement result obtained by first obtainment unit 11 and the fluctuation information obtained by second obtainment unit 12.

Arc detection system 100 configured in this manner has the advantage that false detection of abrupt fluctuations in load 31 as the occurrence of an arc fault can be easily prevented, thus making it easier to prevent false detection of occurrences of arc faults.

For example, with arc detection system 100, second obtainment unit 12 communicates with device 3 to obtain from device 3, as the fluctuation information, an amount of change in the power consumed by load 31. When determination unit 14 determines that an arc has occurred based on the measurement result obtained by first obtainment unit 11 and, at the time of the determination, the amount of change obtained by second obtainment unit 12 is greater than or equal to a threshold, determination unit 14 determines that an arc fault has not occurred.

Arc detection system 100 configured in this manner has the advantage that it is easier to detect an abrupt fluctuation in load 31 by referencing the amount of change in the power consumed by load 31, thus making it easier to prevent false detection of the occurrence of arc faults.

For example, with arc detection system 100, second obtainment unit 12 obtains, as the fluctuation information, a control command transmitted toward device 3. When determination unit 14 determines that an arc has occurred based on the measurement result obtained by first obtainment unit 11 and, at the time of the determination, the control command leads to a threshold amount of change or more in power consumed by load 31, determination unit 14 determines that an arc fault has not occurred.

Arc detection system 100 configured in this manner has the advantage that it can detect an abrupt fluctuation in load 31 without having to obtain an amount of change in the power consumed by load 31 from device 3, thus making it easier to reduce the amount of communication.

For example, in arc detection system 100, when determination unit 14 has determined, for a threshold amount of time Th1 or longer, that an arc has occurred based on the measurement result obtained by first obtainment unit 11, determination unit 14 determines that the arc fault has occurred regardless of the fluctuation information obtained by second obtainment unit 12.

Arc detection system 100 configured in such a manner has the advantage that it is easier to determine that an arc fault has occurred at an early stage compared to when the fluctuation information is referenced.

For example, arc detection system 100 further includes third obtainment unit 13 that obtains status information about the operational status of device 3. When determination unit 14 determines that an arc has occurred based on the measurement result obtained by first obtainment unit 11 and the operational status of device 3 obtained by third obtainment unit 13 indicates device 3 is in a standby state, determination unit 14 determines that an arc fault has occurred regardless of the fluctuation information obtained by second obtainment unit 12.

Arc detection system 100 configured in such a manner has the advantage that it is easier to determine that an arc fault has occurred at an early stage compared to when the fluctuation information is referenced.

For example, the arc detection method includes first obtainment step ST1, second obtainment step ST2, and determination step ST3. In first obtainment step ST1, a measurement result of current I1 flowing in power line L1 or voltage V1 in power line L1 to which power is supplied from power supply 2 is obtained. In second obtainment step ST2, fluctuation information about a fluctuation in load 31 included in device 3 connected to power line L1 is obtained. In determination step ST3, whether or not an arc fault has occurred in power line L1 is determined based on components in a specific frequency band of the measurement result obtained in first obtainment step ST1 and the fluctuation information obtained in second obtainment step ST2.

An arc detection method configured in this manner has the advantage that false detection of abrupt fluctuations in load 31 as the occurrence of an arc fault can be easily prevented, thus making it easier to prevent false detection of occurrences of arc faults.

For example, a non-transitory computer-readable recording medium has recorded thereon a program for causing one or more processors to execute the arc detection method described above.

A recording medium configured in this manner has the advantage that false detection of abrupt fluctuations in load 31 as the occurrence of an arc fault can be easily prevented, thus making it easier to prevent false detection of occurrences of arc faults.

The invention claimed is:

1. An arc detection system comprising:
   a first current meter configured to obtain a measurement result of current flowing in a power line to which power is supplied from a power supply or a measurement result of voltage in the power line;
   a second current meter configured to-obtain fluctuation information about a fluctuation in a load included in a device connected to the power line;
   one or more memories; and
   at least one processor coupled to at least one of the one or more memories and configured to:
   determine whether or not an arc fault has occurred in the power line using a frequency analysis based on components in a specific frequency band of the measurement result, and the fluctuation information;
   communicate with the device to obtain from the device, as the fluctuation information, an amount of change in power consumed by the load; and
   in response to determining that an arc has occurred based on the measurement result and, at a time of the determination, the amount of change is greater than or equal to a threshold, the at least one processor is configured to determine that the arc fault has not occurred.

2. The arc detection system according to claim 1, wherein the second current meter obtain, as the fluctuation information, a control command transmitted toward the device, and
   in response to determining that an arc has occurred based on the measurement result and, at a time of the determination, the control command leads to a threshold amount of change or more in power consumed by the load, the at least one processor is configured to determine that the arc fault has not occurred.

3. The arc detection system according to claim 1, wherein the at least one processor is further configured to:
   in response to determining, for a threshold amount of time or longer, that an arc has occurred based on the measurement result, determine that the arc fault has occurred regardless of the fluctuation information.

4. The arc detection system according to claim 1, wherein the at least one processor is further configured to:
   obtain status information about an operational status of the device, and
   in response to determining that an arc has occurred based on the measurement result and the operational status of the device indicates the device is in a standby state, determine that the arc fault has occurred regardless of the fluctuation information.

5. The arc detection system according to claim 1, wherein the frequency analysis comprises performing a Fast Fourier transform for calculating a frequency spectrum of a time waveform of the measurement result;
   the at least one processor is configured to determine, based on the frequency spectrum, that the arc fault has occurred in response to detecting that if the component in the specific frequency band is greater than a predetermine value.

6. An arc detection method comprising:
   obtaining a measurement result of current flowing in a power line to which power is supplied from a power supply or a measurement result of voltage in the power line;
   obtaining fluctuation information about a fluctuation in a load included in a device connected to the power line; and
   determining whether or not an arc fault has occurred in the power line using a frequency analysis based on components in a specific frequency band of the measurement result obtained, and the fluctuation information obtained,
   wherein obtaining the fluctuation information includes communicating with the device to obtain from the device, as the fluctuation information, an amount of change in power consumed by the load, and
   when it is determined that an arc has occurred and, at a time of the determination, the amount of change is greater than or equal to a threshold, it is determined that the arc fault has not occurred.

7. A non-transitory computer-readable recording medium having recorded thereon a program for causing one or more processors to execute the arc detection method according to claim 6.

8. The arc detection method according to claim 7, wherein the frequency analysis comprises a Fast Fourier transform for calculating a frequency spectrum of a time waveform of the measurement result;
   the determining whether or not the arc fault has occurred comprises determining, based on the frequency spectrum, that the arc fault has occurred in response to detecting that if the component in the specific frequency band is greater than a predetermine value.

* * * * *